United States Patent [19]

Adams

[11] Patent Number: 4,501,878

[45] Date of Patent: Feb. 26, 1985

[54] PROCESS FOR THE PREPARATION OF HIGH MOLECULAR WEIGHT POLYESTERS

[75] Inventor: L. Jane Adams, Kingsport, Tenn.

[73] Assignee: Eastman Kodak Company, Rochester, N.Y.

[21] Appl. No.: 575,371

[22] Filed: Jan. 30, 1984

[51] Int. Cl.³ .................. C08G 63/04; C08G 63/38
[52] U.S. Cl. ............................. 528/286; 528/274; 528/277; 528/278; 528/280; 528/281; 528/283; 528/285
[58] Field of Search ............ 528/274, 277, 278, 280, 528/281, 283, 286, 285

[56] References Cited

U.S. PATENT DOCUMENTS

| 3,998,793 | 12/1976 | Gey et al. | 528/286 X |
| 4,101,526 | 7/1978 | Buxbaum | 528/286 X |
| 4,208,527 | 6/1980 | Horlbeck et al. | 528/286 X |
| 4,328,059 | 5/1982 | Horlbeck et al. | 528/286 X |

Primary Examiner—Lucille M. Phynes
Attorney, Agent, or Firm—Clyde L. Tootle; Gary C. Bailey; Daniel B. Reece, III

[57] ABSTRACT

Disclosed is an improved process for the preparation of high molecular weight linear polyesters. In the preparation of polyesters by formation of a bis-dihydroxy ester prepolymer by transesterifying dimethyl terephthalate with a glycol in the presence of a catalyst followed by polycondensing the prepolymer in the presence of certain phosphorous-containing compounds and a transition metal-containing catalyst which remains active in the presence of said phosphorous compound, an improved rate of polycondensation is achieved by introducing the phosphorous compounds after first polycondensing the prepolymer to a low molecular weight linear polyester having an average degree of polymerization of about 2 to about 10. The improved process further requires that the catalyst employed in the formation of the prepolymer be substantially inactive in the presence of said phosphorous compounds.

9 Claims, No Drawings

PROCESS FOR THE PREPARATION OF HIGH MOLECULAR WEIGHT POLYESTERS

BACKGROUND OF THE INVENTION

This invention relates to an improved process for preparing high molecular weight linear polyesters and more particularly to a process of improving the rate of polycondensation in the production of polyester material.

The preparation of high molecular weight linear polyester material is normally by two reaction stages. In the preparation of polyethylene terephthalate, for example, the first stage consists of the formation of a prepolymer, bis-(2-hydroxyethyl) terephthalate, either by an ester interchange reaction between ethylene glycol and dimethyl terephthalate or by direct esterification of ethylene glycol with terephthalic acid. In the second stage the prepolymer is polycondensed at elevated temperatures under reduced pressure to form the polyester, polyethylene terephthalate.

Typically, various catalysts have been employed to aid both the formation of the prepolymer and the rate of polycondensation. Examples of such catalysts include metal alkanoates, e.g., manganese acetate and cobalt acetate as well as transition metal compounds, e.g., antimony acetate, antimony trioxide and titanium alkoxides. The use of certain phosphorous compounds is also known to be advantageous in the preparation of polyester material, particularly to improve selected physical properties of the polyester material. For example, U.S. Pat. No. 3,028,366 teaches that by adding small amounts of certain phosphorous containing compounds, such as phosphoric acid, alkyl-, hydroxyalkyl- or aryl-phosphates, to the prepolymer, and then polycondensing in the presence of a metal-containing catalyst, substantially colorless polymer can be obtained. U.S. Pat. No. 3,441,540 discloses the use of polymeric phosphoric and/or phosphorous esters of polyhydric alcohols during the polycondensing stage to obtain polymers having improved thermal stability and whiteness. See also Kamatani et al, *Polymer Journal*, Vol. 12, No. 2, pp. 125-130 (1980), who report the polycondensation of bis(-2-hydroxyethyl)terephthalate in the presence of antimony acetate and phosphoric acid.

An improved process for producing high molecular weight linear polyester material has now been found. Surprisingly, it has been found that in polyester processes which employ selected transesterification and polycondensation catalysts the polycondensation rate can be increased by delaying the addition of known phosphorous-containing compounds until after the prepolymer has first been polycondensed to a certain degree of polymerization.

The process of the present invention requires that the phosphorous containing compound be added after only a short period of polycondensation relative to the entire period of polycondensation. By the process of the present invention, polyesters such as polyethylene terephthalate having good physical properties are produced in less time and thus more economically than previously since polycondensation to a desired molecular weight can be achieved within a shorter period of time.

SUMMARY OF THE INVENTION

The present invention concerns an improved process for the preparation of high molecular weight linear polyesters by (a) forming a bis-dihydroxy ester prepolymer by reacting dimethyl terephthalate with a glycol in the presence of a suitable transesterification catalyst, and (b) polycondensing the resulting prepolymer in the presence of one or more phosphorous-containing compounds, the polycondensing being conducted in the presence of a transition metal-containing polycondensation catalyst which is active in the presence of said phosphorous compound. The improvement comprises employing a transesterification catalyst which is substantially inactive in the presence of said phosphorous compound and introducing the phosphorous compound into the polycondensation reaction zone after first polycondensing the prepolymer until a low molecular weight linear polyester having an average degree of polymerization of about 2 to about 10 is obtained followed by polycondensing in the presence of said phosphorous compound until a high molecular weight linear polyester of the desired inherent viscosity is obtained.

DETAILED DESCRIPTION OF THE INVENTION

The invention described herein relates to a process for producing high molecular weight linear polyester more rapidly by increasing the rate of polycondensation.

The process comprises first forming a bis-dihydroxy ester prepolymer by conventional transesterification techniques starting with dimethylterephthalate and a glycol. A suitable transesterification catalyst is employed in this stage of the process. The catalyst employed is characterized as one which, upon exposure to the phosphorous compounds described herein, is rendered substantially inactive. Various catalysts are known in the art to be suitable for this transesterification step. The catalysts which may be used include organic and inorganic compounds of one or more metals such as manganese, cobalt, zinc, calcium, etc. Typical catalysts heretofore known and which may be utilized include, for example, cobaltous acetate tetrahydrate, manganese acetate, manganous benzoate tetrahydrate, zinc acetate tetrahydrate, etc. The amount of catalyst (or catalyst mixture) employed may be varied widely but generally will be from about $10^{-5}$ to about $10^{-3}$ moles per mole of diester reactant.

The process of the present invention further comprises polycondensing the bis-dihydroxyester prepolymer under reduced pressure at elevated temperature for a period of time sufficient to obtain the desired high molecular weight polyester, as determined by the I.V. of the polymer. This portion of the process of this invention is carried out in the presence of one or more catalysts which remain active in the presence of the phosphorous-containing compounds described herein.

The catalysts most suitable for this process are organic and inorganic antimony-containing compounds. Various antimpny compounds are known in the art to be suitable polycondensing catalysts. Included among these are, for example, antimony-III-oxide, antimony-III-acetate and antimony glycolate. Additional transition metal-containing compounds may be employed in combination with the above-described antimony compounds in minor amounts. The term "minor amounts" as used herein is intended to mean less than about 50 weight % and prefereably less than about 10 weight %, based on the total metal content, of other transition metals. Preferred additional transition metal-containing compounds are titanium compounds. Examples of these compounds include acetyl triisopropyl titanate, titanium tetraisopropoxide and titanium glycolate. The amount of total catalyst employed may be varied widely but generally will be from about $10^{-5}$ to about $10^{-3}$ moles per mole of diester reactant. If desired, the polycondensation catalyst may be added at the beginning of the transesterification stage of the process. This is particularly advantageous for operation of the process continuously.

The polycondensing stage of this process further comprises the addition of certain phosphorous-containing compounds into the polycondensation reaction zone. To achieve the enhanced polycondensation rate it is essential that addition of the phosphorous-containing compounds be delayed until some initial polymerization has occurred, that is, until a low molecular weight polymer having an average degree of polymerization of about 2 to about 10 is obtained. After the desired degree of polymerization has been achieved the phosphorous compounds are introduced into the polycondensation reaction zone and polycondensing continued under reduced pressure at elevated temperatures until a polyester of the desired I.V. is obtained.

The term "phosphorous-containing" compounds as used herein is intended to mean one or more compounds which contain phosphorous and which are known in the prior art to be useful as stabilizers or color forming inhibitors in polyester polycondensing reactions. Some of the phosphorous compounds suitable for this process are disclosed in U.S. Pat. Nos. 3,028,366 (1962) and 3,962,189 (1976), the disclosure of which is hereby incorporated by reference. Preferred of the phosphorous compounds are phosphoric acid, salts of said acid, and phosphate esters, including, for example, ethyl acid phosphate, diethyl acid phosphate, triethyl acid phosphate, aryl alkyl phosphate, tris-2-ethylhexylphosphate, and a phosphate ester having the formula

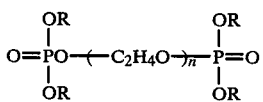

wherein n has an average value of 1.5 to about 3.0 with about 1.8 being most preferred and each R is hyrogen or an alkyl radical having from 6 to 10 carbon atoms with octyl being most preferred, the ratio of the number of R groups of hydrogen atoms to the number of phosphorus atoms being about 0.25 to 0.50 with about 0.35 being most preferred; and the ester having a free acidity equivalent of about 0.2 to 0.5.

The amount of phosphorous-containing compounds employed will vary depending on the amount of transesterification catalyst used. Normally an amount in the range of about 0.5 to about 2.0 moles for each mole of catalyst is suitable.

The process of this invention is applicable to the preparation of polyesters derived from dimethyl terephthalate. One or more additional esters, however, may also be incorporated in up to about 20 mole % based on a total ester content of 100 mole %. Other well-known polyester-forming esters include those based on the diacids isophthalic acid, 1,4-cyclohexanedicarboxylic acid and linear lower alkyl diacids such as succinic, glutaric, adipic, sebacic, maleic, fumaric acids, etc.

The glycol component employed in the process of this invention comprises glycols having up to about 8 carbon atoms.

Preferably the glycol component comprises one or more glycols wherein at least a major portion of which is ethylene glycol. The term "major portion" as used herein is intended to mean that greater than about 50 mole percent and preferably greater than about 85 mole percent, based on the total amount of glycol present, of ethylene glycol is employed. Thus, other known polyester-forming glycols may be employed in amounts less than about 50 mole percent and preferably less than about 15 mole percent. Examples of additional glycols include diethylene glycol; 1,4-cyclohexanedimethanol; propylene glycol; 1,4-butanediol; 2,2,4-trimethyl-1,3-pentanetediol; 2,2-dimethyl-1,3-propanediol, etc. The glycols preferred in addition to ethylene glycol are diethylene glycol and 1,4-cyclohexanedimethanol.

The polesters produced by the process of this invention preferably have an I.V. of about 0.35 to about 0.8 when measured at 25° C. in a 60/40 by weight mixture of phenol/tetrachloroethane at a concentration of 0.5 g/100 ml.

The temperature and pressure employed in the present process are conventional for polyester production. The polyesters produced by this invention may be formulated into various articles by methods well known in the art. For example, they may be extruded by conventional techniques into sheets, fibers, films, and the like as well as molded, for example, by compression molding, into containers suitable for packaging beverages, food items and pharmaceuticals.

The process of this invention is of particular utility in the manufacture of poly(ethylene terephthalate) derived from dimethyl terephthalate and ethylene glycol which may contain up to about 5 mole % diethylene glycol, and from 0 to about 30 mole % of 1,4-cyclohexanedimethanol, all based on a glycol content of 100 mole %.

Various additives which do not adversely affect the polyesters described herein may also be incorporated into the polyester material. Some of these include antioxidant stabilizers, colorants, lubricants, mold releasing agents, etc., as well as various other additives all of which are well known in the art.

The following examples are given to further illustrate the invention, but it is understood that the invention is not to be limited in any way by the details described therein.

EXAMPLE 1

The prepolymer ester exchange product prepared from dimethylterephthalate (1.0 mole) and ethylene glycol (2.0 moles) along with a catalyst system of 110 ppm Mn, 50 ppm Co, 250 ppm Sb were placed in a laboratory flask. 90 ppm P in the form of a phosphate ester described herein before was added to the flask and the contents heated at 280° C. under $N_2$ and under 100 mm Hg vacuum for approximately 20 minutes. The vacuum was increased to 0.5 mm Hg and heating continued at 280° C. for 40 additional minutes. The I.V. of the resulting polymer was 0.347.

EXAMPLE 2

The procedure in Example 1 was repeated with the exception that the phosphate ester was introduced into the reaction flask after first heating the contents approximately 10 minutes at 280° C. under 100 mm Hg vacuum. Heating at the same temperature and vacuum was then continued for 10 additional minutes. The vacuum was increased and the process completed as in Example 1. The I.V. of the resulting polymer was 0.465.

EXAMPLE 3

The procedure in Examples 1 and 2 were repeated substituting purified bis(2-hydroxyethyl)terephthalate in place of the ester exchange product. The I.V. of the polymer obtained by the process in which the phosphate ester was added initially was 0.414. The I.V. of the polymer obtained by the process in which the addition of the phosphate ester was delayed was 0.477.

The invention has been described in detail with particular reference to preferred embodiments thereof, but it will be understood that variations and modifications can be effected within the spirit and scope of the invention.

I claim:

1. In the process for the preparation of high molecular weight linear polyester by the steps of
    (a) reacting dimethyl terephthalate with a glycol containing up to about 8 carbon atoms in the presence of a transesterification catalyst to form a bis-dihydroxy ester prepolymer,
    (b) polycondensing said prepolymer in the presence of one or more phosphorous-containing compounds and a transition metal containing polycondensation catalyst which is active in the presence of said phosphorous compound,
the improvement comprising employing a transesterification catalyst which is substantially inactive in the presence of said phosphorous-containing compound and introducing said phosphorous compound into the polycondensation reaction zone after first polycondensing said prepolymer until a low molecular weight linear polyester having an average degree of polymerization of about 2 to about 10 is obtained and polycondensing in the presence of said phosphorous compound until a linear polyester having an inherent viscosity of about 0.35 to about 0.8 is obtained.

2. The process of claim 1 wherein the phosphorous-containing compound is selected from the group comprising phosphoric acid, salts of said acid, ethyl acid phosphate, diethyl acid phosphate, triethyl acid phosphate, aryl alkyl phosphate, tris-2-ethylhexyl phosphate and a phosphate ester having the formula

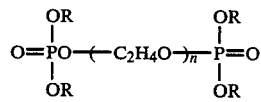

wherein n has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5.

3. The process of claim 1 wherein the transesterification catalyst comprises one or more catalysts selected from the group consisting of cobaltous acetate tetrahydrate, manganese acetate and zinc acetate.

4. The process of claim 1 wherein the polycondensation catalyst comprises an antimony compound.

5. The process of claim 4 wherein the antimony compound is antimony-III-acetate.

6. The process of claim 1 wherein the polycondensation catalyst comprises antimony and up to about 10 weight % titanium, based on the total weight of metal employed.

7. The process of claim 2 wherein the phosphorous-containing compound is present in the amount to provide phosphorous in the amount of about 0.5 to about 2.0 moles per mole of transesterification catalyst.

8. The process of claim 1 wherein the bis-dihydroxy ester is bis(2-hydroxyethyl)terephthalate.

9. The process of claim 1 wherein the glycol comprises ethylene glycol, from 0 to about 30 mole % 1,4-cyclohexanedimethanol, and up to about 5 mole % diethylene glycol.

* * * * *